US012758987B2

(12) United States Patent
Cobb et al.

(10) Patent No.: US 12,758,987 B2
(45) Date of Patent: Oct. 13, 2026

(54) GAS EXTRACTOR PROVIDING ACTIVE FLUID TRANSPORT AND CIRCULATION

(71) Applicant: Surface Logging Solutions, LLC, Houston, TX (US)

(72) Inventors: Isaac David Cobb, Tomball, TX (US); Gary Lee Buttrey, Richmond, TX (US); George Joel Rodger, Houston, TX (US); Avel Z. Ortiz, Houston, TX (US); Roger A. Furley, Houston, TX (US)

(73) Assignee: Surface Logging Solutions, LLC, Houston, TX (US)

( * ) Notice: Subject to any disclaimer, the term of this patent is extended or adjusted under 35 U.S.C. 154(b) by 370 days.

(21) Appl. No.: 18/386,870

(22) Filed: Nov. 3, 2023

(65) Prior Publication Data

US 2024/0149281 A1 May 9, 2024

Related U.S. Application Data

(60) Provisional application No. 63/422,493, filed on Nov. 4, 2022.

(51) Int. Cl.
*B01D 19/00* (2006.01)
*B01D 45/12* (2006.01)
(Continued)

(52) U.S. Cl.
CPC ............ *B04C 9/00* (2013.01); *B01D 19/0057* (2013.01); *B04C 5/10* (2013.01); *B04C 5/103* (2013.01); *B04C 2009/007* (2013.01)

(58) Field of Classification Search
CPC .. B04C 9/00; B04C 5/10; B04C 5/103; B04C 2009/007; B04C 2003/003;
(Continued)

(56) References Cited

U.S. PATENT DOCUMENTS 3,213,794 A 10/1965 Adams
4,326,863 A * 4/1982 Day .................... E21B 21/067 96/182

(Continued)

FOREIGN PATENT DOCUMENTS

CA 2708799 A1 12/2011
CA 2939429 A1 11/2015

*Primary Examiner* — Frank M Lawrence, Jr.
(74) *Attorney, Agent, or Firm* — Stephen Y. Liu; Carstens, Allen & Gourley, LLP

(57) ABSTRACT

Apparatus, system, and method for separating gas from a composite fluid. The apparatus includes a main body defining a flow path formed from a separations chamber at an upstream end of the flow path and a head space chamber at the downstream end of the flow path. The main body includes a first set of apertures disposed about the separations chamber and a second set of apertures disposed about the head space chamber. An agitator is housed within the main body at an upstream end of the separations chamber and is configured to generate a vortex that conveys the composite fluid through the flow path. The vortex expels a liquid fraction and a solids fraction of the composite fluid from the first set of apertures, and the vortex conveys a gaseous fraction of the composite fluid into the head space chamber for extraction from the second set of apertures.

35 Claims, 20 Drawing Sheets

(51) Int. Cl.

| | |
|---|---|
| ***B04C 5/10*** | (2006.01) |
| ***B04C 5/103*** | (2006.01) |
| ***B04C 9/00*** | (2006.01) |

(58) Field of Classification Search

CPC .......... B04C 2003/006; B01D 19/0057; B01D 17/0217; B01D 19/0005; B01D 19/0052; B01D 19/0063

USPC .... 95/261, 262, 270; 96/196, 204, 208, 214, 96/216, 217

See application file for complete search history.

(56) References Cited

U.S. PATENT DOCUMENTS

| | | | | |
|---|---|---|---|---|
| 5,199,509 | A * | 4/1993 | Wright .................. | E21B 49/005 175/206 |
| 5,209,765 | A | 5/1993 | Kolpak et al. | |
| 5,648,603 | A * | 7/1997 | Hanson .............. | B01D 19/0057 73/863 |
| 6,389,878 | B1 * | 5/2002 | Zamfes ............. | B01D 19/0052 96/155 |
| 7,125,221 | B2 | 10/2006 | Dorsch et al. | |
| 7,957,903 | B1 * | 6/2011 | Selman ................. | E21B 21/067 73/19.09 |
| 9,765,617 | B2 | 9/2017 | Gosney et al. | |
| 9,879,489 | B2 * | 1/2018 | Shanks .............. | B01D 19/0052 |
| 2002/0178924 | A1 | 12/2002 | Brown et al. | |
| 2006/0254421 | A1 * | 11/2006 | Boone ................... | E21B 21/067 95/260 |
| 2008/0006011 | A1 | 1/2008 | Larnholm et al. | |
| 2009/0205497 | A1 | 8/2009 | Morgan | |

* cited by examiner

GAS EXTRACTOR PROVIDING ACTIVE FLUID TRANSPORT AND CIRCULATION

CROSS-REFERENCE TO RELATED APPLICATIONS

This application claims priority to U.S. Provisional Patent Application No. 63/422,493, filed on Nov. 4, 2022, which is hereby incorporated herein by reference in its entirety.

BACKGROUND

Technical Field

Novel aspects of the present disclosure relate to the field of gas extraction and more particularly to a method and apparatus for gas extraction which can also provide active fluid transport and circulation in a vessel filled with a composite fluid with inconsistent depth.

Background

A composite fluid is a fluid formed from two or more substances. For example, a composite fluid can include any combination of a liquid fraction, a gaseous fraction, and a solids fraction. Further, each fraction can include two or more different substances. For example, a liquid fraction can include water and oil, and a gaseous fraction can include oxygen and nitrogen.

A composite fluid can be produced in oilfield drilling operations. Analysis of the composite fluid, i.e., mud logging, provides useful information, such as the rate of penetration, observable porosity of the rock structure, lithology, and presences of gases. Mud logging is invaluable for determining the type of oil and/or gas contained within a particular formation.

SUMMARY OF THE INVENTION

Novel aspects of the present disclosure are directed to an apparatus for separating gas from a composite fluid. The apparatus includes a main body defining a flow path formed from a separations chamber at an upstream end of the flow path and a head space chamber at the downstream end of the flow path. The main body further includes a first set of apertures disposed about the separations chamber portion of the main body, and a second set of apertures disposed about the head space chamber portion of the main body. The apparatus also includes an agitator housed within the main body at an upstream end of the separations chamber. The agitator is configured to generate a vortex that conveys the composite fluid through the flow path. The vortex expels a liquid fraction and a solids fraction of the composite fluid from the main body via the first set of apertures, and the vortex conveys a gaseous fraction of the composite fluid into the head space chamber for extraction from the second set of apertures.

Novel aspects of the present disclosure are also directed to a system for separating gas from a composite fluid. The system includes a vessel storing a composite fluid including a gas, a gas extractor configured to separate the gas from the composite fluid to form a gaseous fraction; and a gas analyzer fluidically coupled to the gas extractor which is configured to analyze the gaseous fraction. The gas extractor includes a main body defining a flow path formed from a separations chamber at an upstream end of the flow path and a head space chamber at the downstream end of the flow path. The main body further includes a first set of apertures disposed about the separations chamber portion of the main body, and a second set of apertures disposed about the head space chamber portion of the main body. The gas extractor also includes an agitator housed within the main body at an upstream end of the separations chamber. The agitator is configured to generate a vortex that conveys the composite fluid through the flow path. The vortex expels a liquid fraction and a solids fraction of the composite fluid from the main body via the first set of apertures, and the vortex conveys a gaseous fraction of the composite fluid into the head space chamber for extraction from the second set of apertures.

Novel aspects of the present disclosure are also directed to a method for separating gas from a composite fluid. The method includes receiving a composite fluid into an inlet of the gas extractor. The inlet is at a first end of a main body defining a flow path formed from a separations chamber at an upstream end of the flow path and a head space chamber at the downstream end of the flow path. The method also includes the step of generating a vortex in the composite fluid within the main body. The vortex, which is generated by an agitator housed within the main body, conveys the composite fluid through the flow path. The method also includes the steps of expelling a liquid fraction and a solids fraction of the composite fluid from the main body through a first set of apertures disposed about the separations chamber portion of the main body and conveying a gaseous fraction of the composite fluid into the head space chamber for extraction from a second set of apertures disposed about the head space chamber portion of the main body.

Other aspects, embodiments and features of the disclosure will become apparent from the following detailed description of the disclosure when considered in conjunction with the accompanying figures. In the figures, each identical, or substantially similar component that is illustrated in various figures is represented by a single numeral or notation. For purposes of clarity, not every component is labeled in every figure. Nor is every component of each embodiment of the disclosure shown where illustration is not necessary to allow those of ordinary skill in the art to understand the disclosure.

BRIEF DESCRIPTION OF THE FIGURES

The novel features believed characteristic of the disclosure are set forth in the appended claims. The disclosure itself, however, as well as a preferred mode of use, further objectives and advantages thereof, will be best understood by reference to the following detailed description of illustrative embodiments when read in conjunction with the accompanying figures, wherein:

DETAILED DESCRIPTION

Initial deployment of remote mud logging technologies was plagued with one basic, yet persistent, problem. The possum belly levels from rig to rig were too inconsistent to reliably mud log a well from start to finish. Additionally, mud logging gas extraction technology widely deployed in the field had remained unchanged for decades. With the development of more precise instruments of analysis, and the demand for high data fidelity, there needed to be improvements in the reliability, quantifiability, and efficacy of the equipment the field services sector relied upon to remove the pore fluids for analysis.

Novel aspects of the present disclosure recognize the need for a gas extractor, which provides higher fidelity while also being steadfast against changes in fluid levels and not requiring regular maintenance, and which can be ideally deployed in high fidelity remote logging operations. The higher fidelity is made possible by reduced contamination from atmospheric gases, increased area of the liberation surface, consistent exposure times of composite fluid at the liberation surface, near constant volume of fluid in the separations chamber, and active fluid transport through the gas extractor. For the sake of consistency, the gas extractors described herein will be directed to mud logging of composite fluids generated during oilfield drilling operations. However, the novel aspects of this disclosure can be directed to gas extractors used with any type of composite fluids produced in or used with in any number of different industries.

Figure 1:
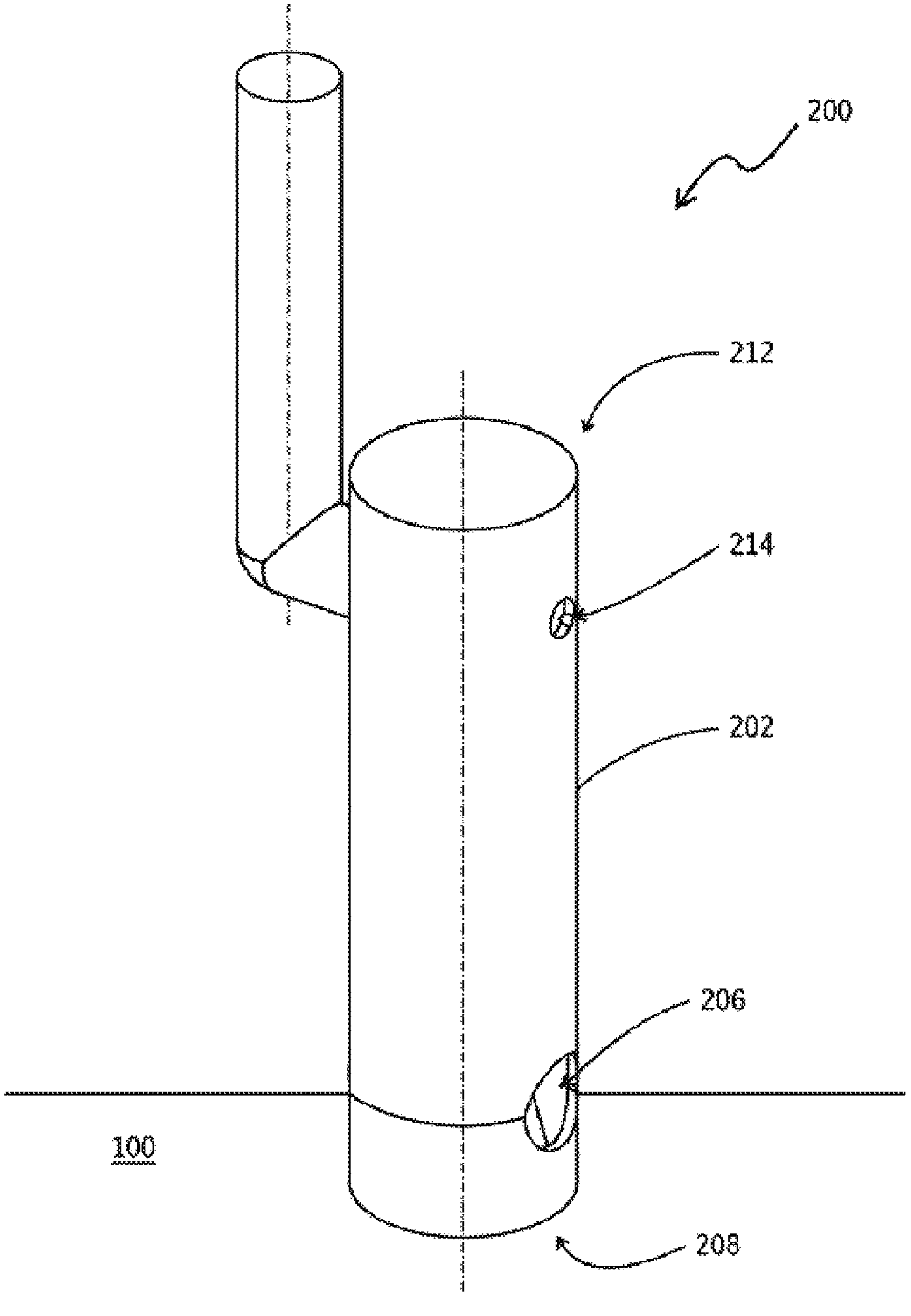
FIG. 1 Prior Art
FIG. 1 is a perspective view of a conventional gas extractor.
Figure 2:
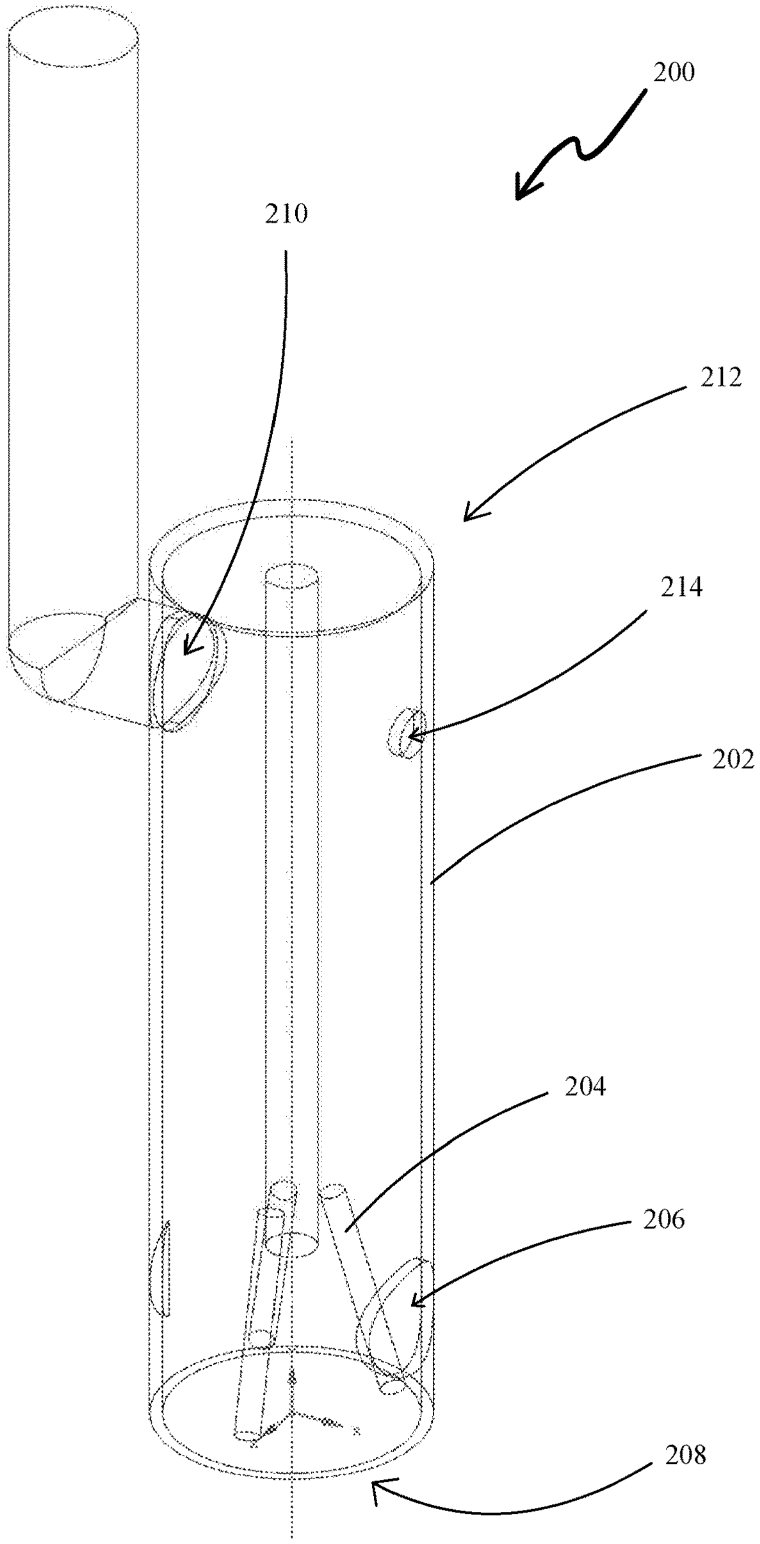
FIG. 2 Prior Art
FIG. 2 is a perspective view in wireframe of the gas extractor of FIG. 1 depicting the interior details.

FIGS. 1 and 2 are various perspective views of a conventional gas extractor. In particular, FIG. 1 is a perspective view depicting the gas extractor 200 partially submerged in a composite fluid 100 and FIG. 2 is a perspective view in wireframe of the gas extractor 200, which depicts the agitator 204 housed within the elongated body 202 of the gas extractor 100.

A composite fluid 100 enters the elongated body 202 through an inlet 206 at a first end 208 of the elongated body 202. When generated during oilfield drilling operations, the composite fluid 100 can include drilled cuttings and fluids from oil and gas exploration. The composite fluid 100 is agitated within the gas extractor 200 by the agitator 204. Any gases liberated from the composite fluid by operation of the agitator 204 is extracted from the gas outlet 210 at the second end 212 of the elongated body 202 and analyzed by a gas analyzer (not shown). The gas extractor 100 can include an optional breather hole 214 that prevents uptake of composite fluid 100 by the gas analyzer in the event that inlet 206 is completely submerged within the composite fluid 100.

During operation, the agitator 204 agitates the composite fluid 100 within the elongated body 202. The liberation surface of the composite fluid 100 within the elongated body is generally circular, which limits the amount of gas that can be liberated from the composite fluid 100. Additionally, the presence of the breather hole 214 introduces atmospheric gases into the separations chamber and makes it challenging to properly quantify resultant gas data.

Figure 3:
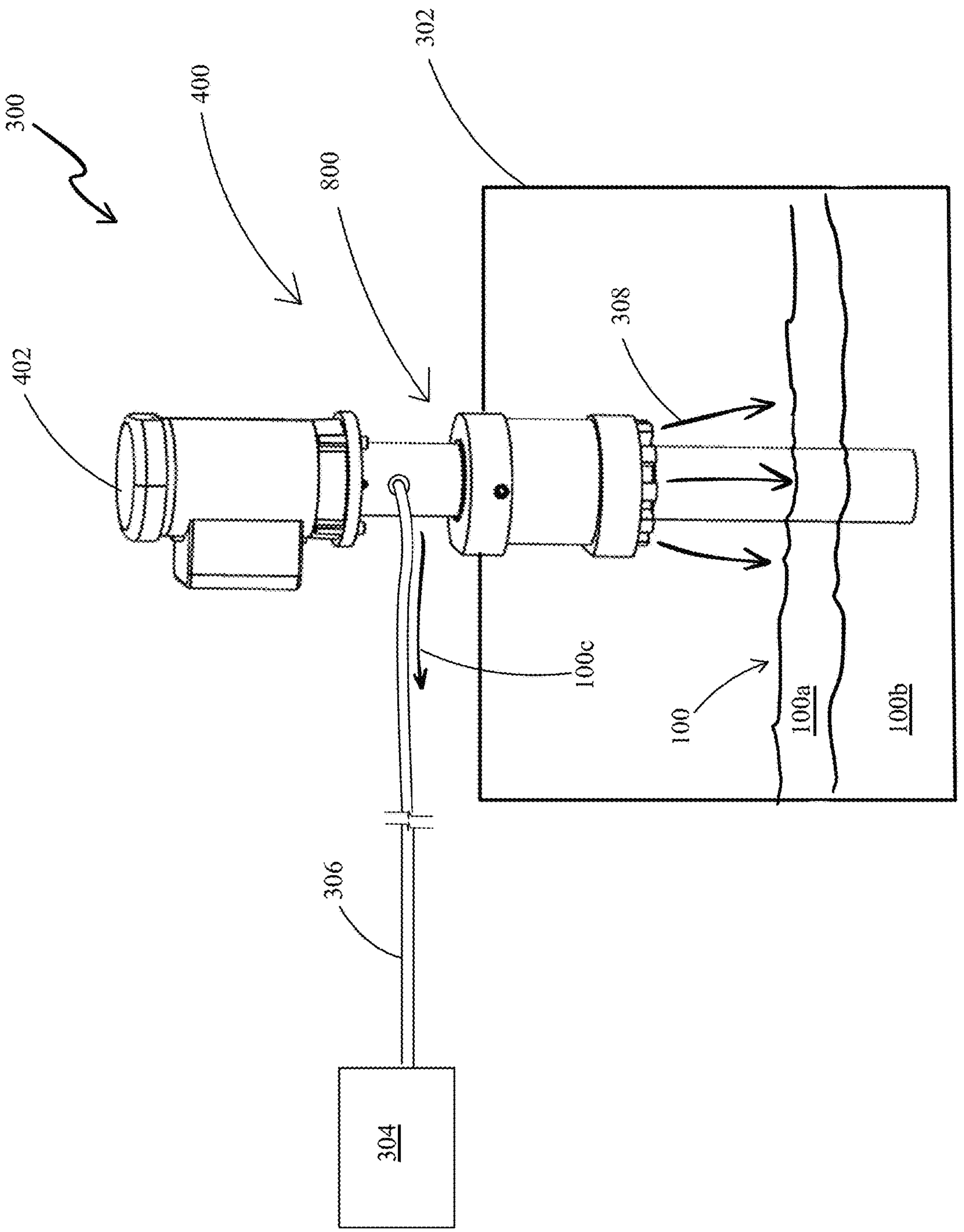
FIG. 3 is a simplified schematic diagram of a gas extractor installed in a vessel in accordance with an illustrative embodiment.

FIG. 3 is a simplified schematic diagram of a gas extractor installed in a vessel in accordance with an illustrative embodiment. The system 300 includes a vessel 302 accumulating a composite fluid 100. In an embodiment in which the composite fluid 100 is produced during oilfield drilling operations, the vessel 302 can be a vessel colloquially referred to as a “possum belly”. The system 300 also includes a motorized gas extractor 400, which is formed generally from a motor 402 connected to a gas extractor 800, fluidically coupled to a gas analyzer 304 by a fluid conduit 306.

The composite fluid 100 is formed from a liquid fraction 102*a*, a solids fraction 102*b*, and a gas fraction, which is represented by arrow 102*c*. The gas fraction 102*c* can be entrained within the composite fluid 100 and liberated from the composite fluid 100 by the motorized gas extractor 400 as shown and described in more detail in the figures that follow. The gas fraction 102*c* is extracted from the motorized gas extractor 400 and sent to a gas analyzer 304. The liquid fraction 100*a*, the solid fraction 100*b*, and any entrained gas not liberated from the composite fluid 100 is returned to the vessel 302 in a recycle stream, represented by arrows 308. By continuously refreshing the composite fluid 100 in the vessel 302 at a predetermined rate, motorized gas extractor 400 provides the gas analyzer 304 with representative gases produced at known depths within a borehole.

Figure 4:
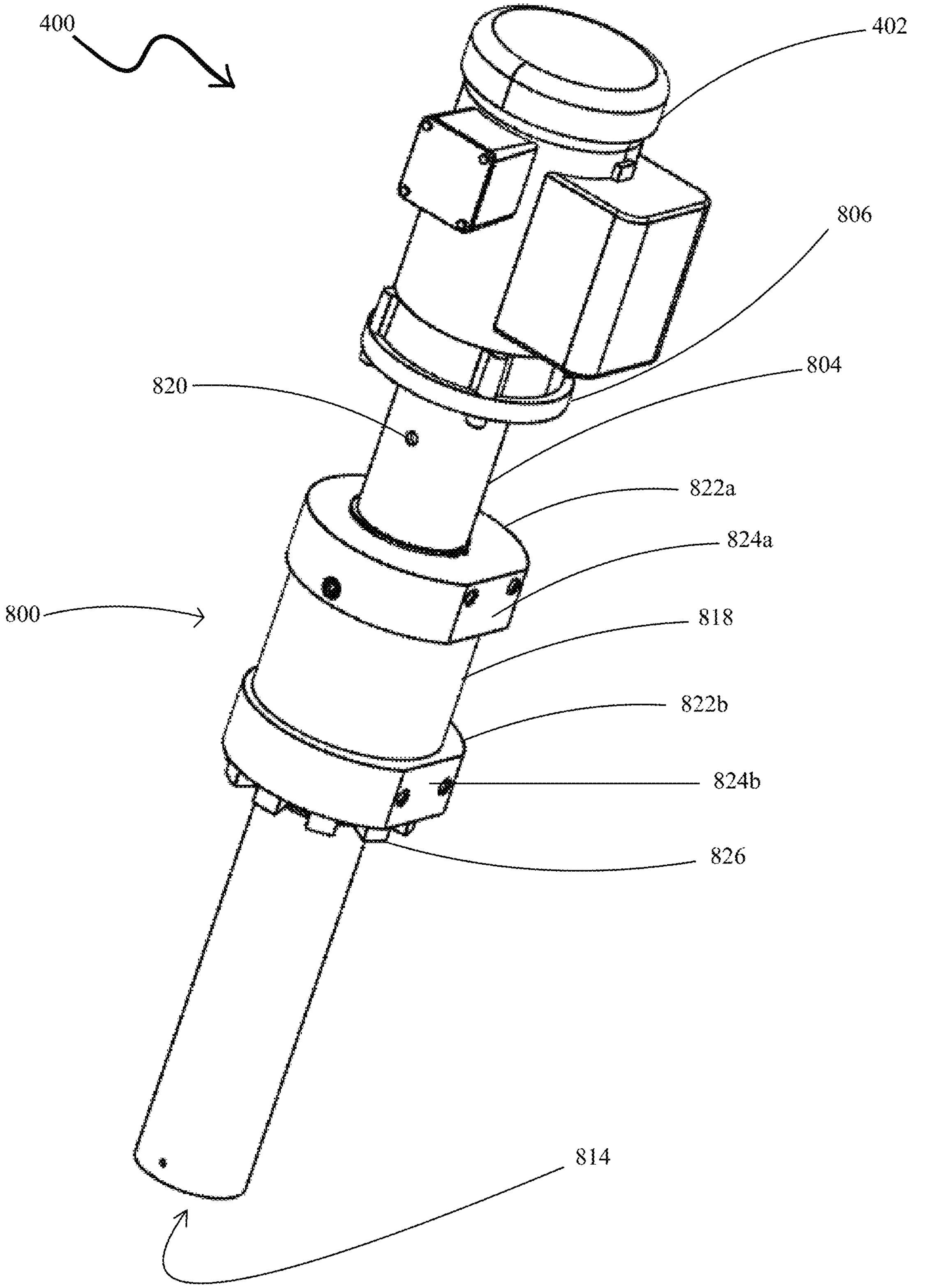
FIGS. 4-6 are various perspective views of a gas extractor according to an illustrative embodiment.
Figure 5:
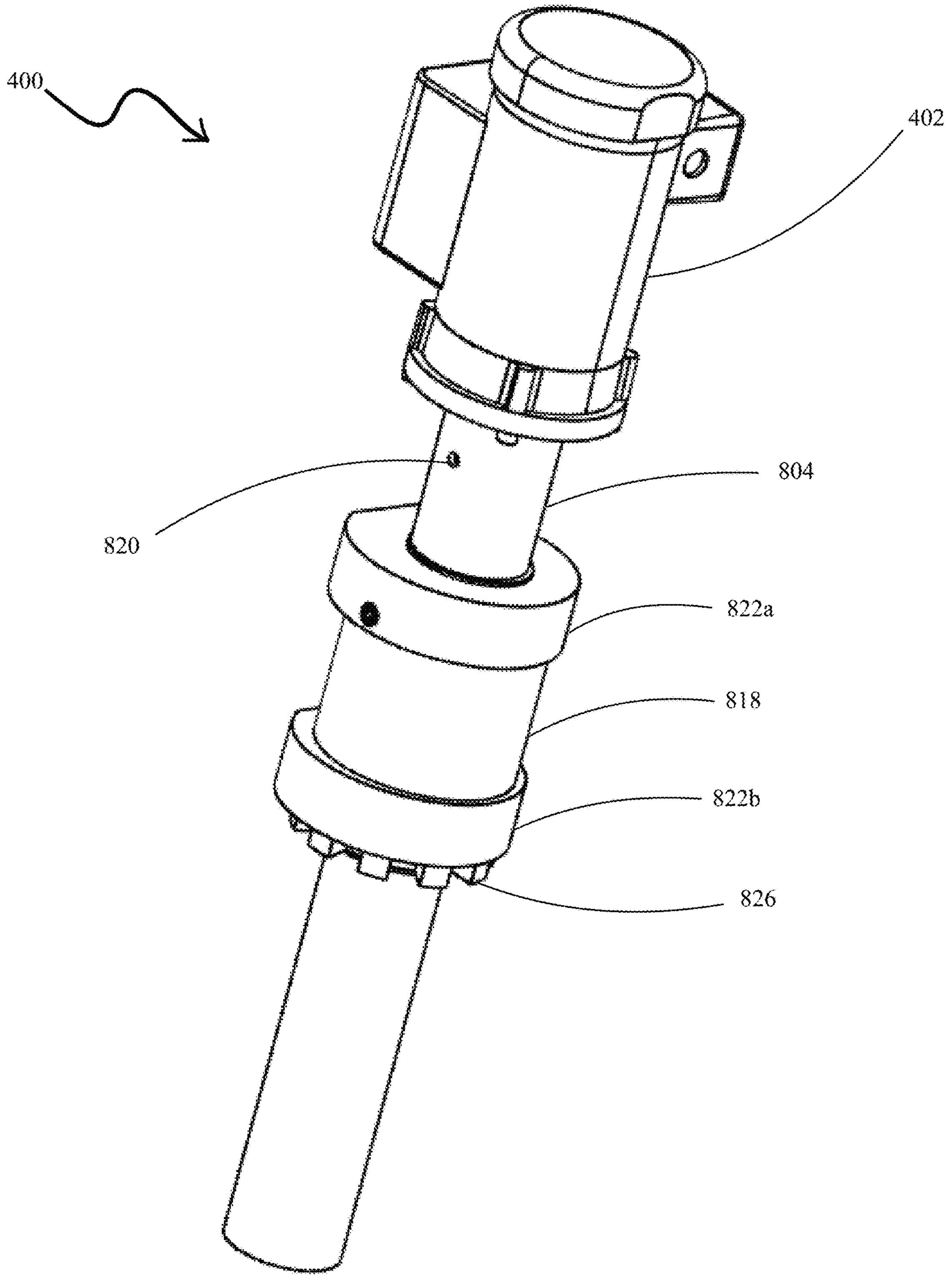
Figure 6:
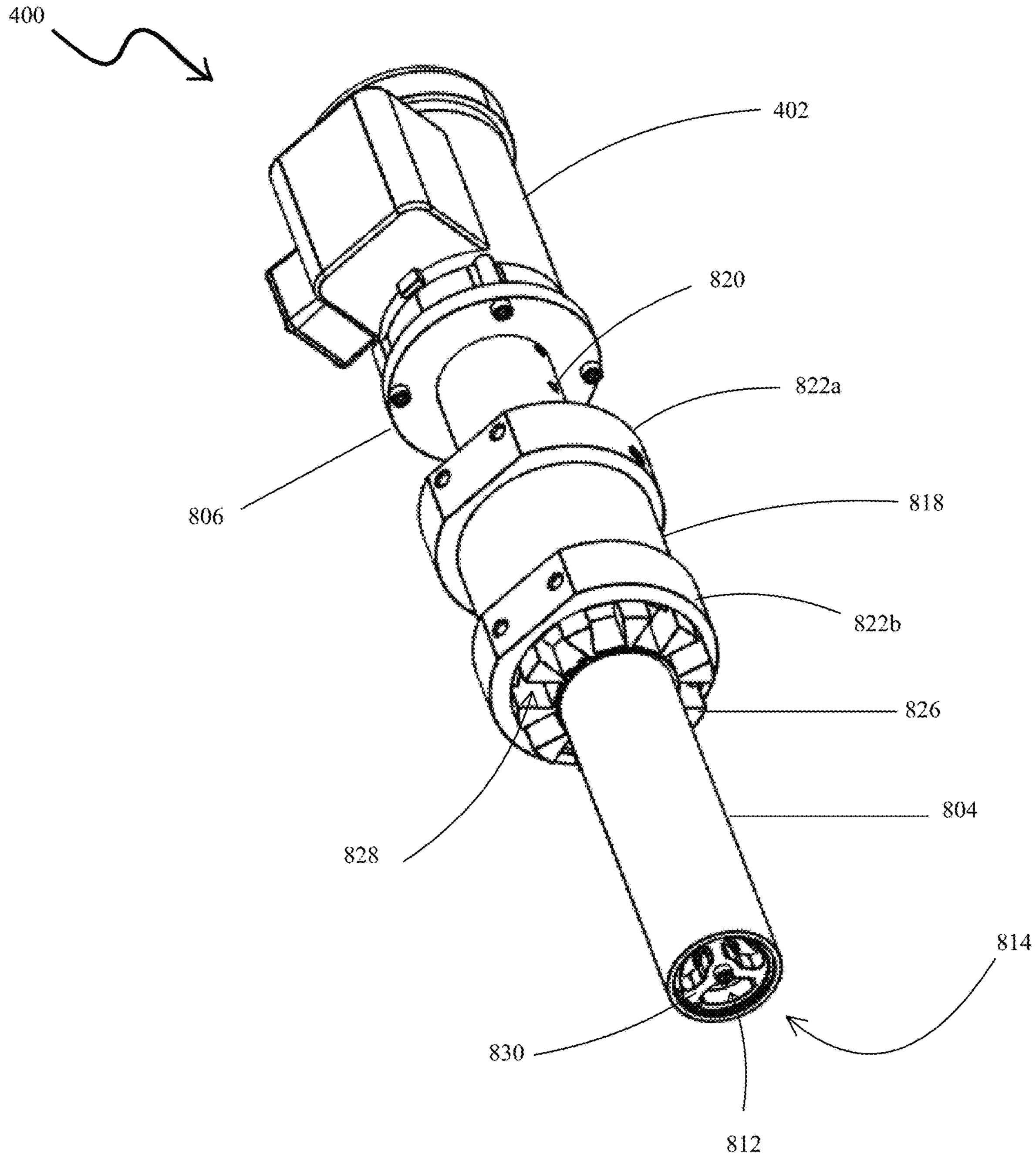

FIGS. 4-6 are various perspective views of a gas extractor according to an illustrative embodiment. With particular reference to FIG. 4, the motorized gas extractor 400 includes a motor 402 attached to a main body 804 by a motor mount 806. The main body 804 defines a flow path 1100, which is shown in more detail in FIG. 11. The flow path 1100 is formed from a separations chamber 808 at an upstream end of the flow path and a head space chamber 810 at the downstream end of the flow path. As used herein, the “upstream end” and the “downstream end” of the flow path 1100 are determined relative to the direction of fluid flow and not orientation relative to the gravitational vector. In an exemplary use case, the direction of fluid flow through the main body 804 is in a direction that is generally opposite to the direction of the gravitational vector.

Composite fluid 100 enters the motorized gas extractor 400 from an opening 812 at a first end 814 of the main body. A gaseous fraction 100*c* of the composite fluid 100 is liberated from the composite fluid 100 in the separations chamber 808 and conveyed into the head space chamber 810 for extraction. The remaining liquids fraction 100*a*, solids fraction 100*b*, and entrained gas is expelled from the separations chamber 808 of the motorized gas extractor 400.

The motorized gas extractor 400 includes a first set of apertures 816 disposed about the separations chamber 808 of the main body 804. As used herein, the term "set" means one or more. Thus, a set of apertures can be a single aperture or two or more apertures. In a non-limiting embodiment, the first set of apertures 816 includes a plurality of apertures disposed about the main body at a downstream end of the separations chamber 808. In FIG. 4, the first set of apertures 816 are hidden by the downspout sleeve 818 circumscribing at least a portion of the main body 804. The first set of apertures 816 are shown and described in more detail in FIG. 10. The downspout sleeve 818 controls the release of the liquids fraction 100*a*, the solids fraction 100*b*, and the entrained gas from the first set of apertures 816.

A second set of apertures 820 is disposed about the head space chamber 810 of the main body 804. The gas fraction 100*c* of the composite fluid is extracted from the motorized gas extractor 400 from the second set of apertures 820, as depicted in FIG. 3. In this illustrative embodiment, the separations chamber 808 and the head space chamber 810 are both housed within the main body 804, coaxially aligned and with the head space chamber 810 downstream from the separations chamber 808. The relative locations of the head space chamber 810 and the separations chamber 808 are shown in FIG. 5, and again in greater detail in FIGS. 10 and 11.

At least one mounting ring 822 is secured to the main body 804 for mounting the downspout sleeve 818 to the main body 804. In this illustrative embodiment, the motorized gas extractor 400 includes two mounting rings, an upper mounting ring 822*a* and a lower mounting ring 822*b*, each of which can include a mounting face 824 that facilitates attachment to a mounting surface, such as a sidewall of the vessel 302. As depicted in FIG. 4, mounting ring 822*a* has a mounting face 824*a* and mounting ring 822*b* has a mounting face 824*b*.

The motorized gas extractor 400 can include a downspout annulus 826 coupled between the main body 804 and the downspout sleeve 818. The downspout annulus 826 provides support for the downspout sleeve 818 and can include one or more apertures 828 that allow the recycle stream 308 to return to the vessel 302. A more detailed view of the downspout annulus 826 with the one or more apertures 828 is shown and described in FIG. 9.

Figure 10:
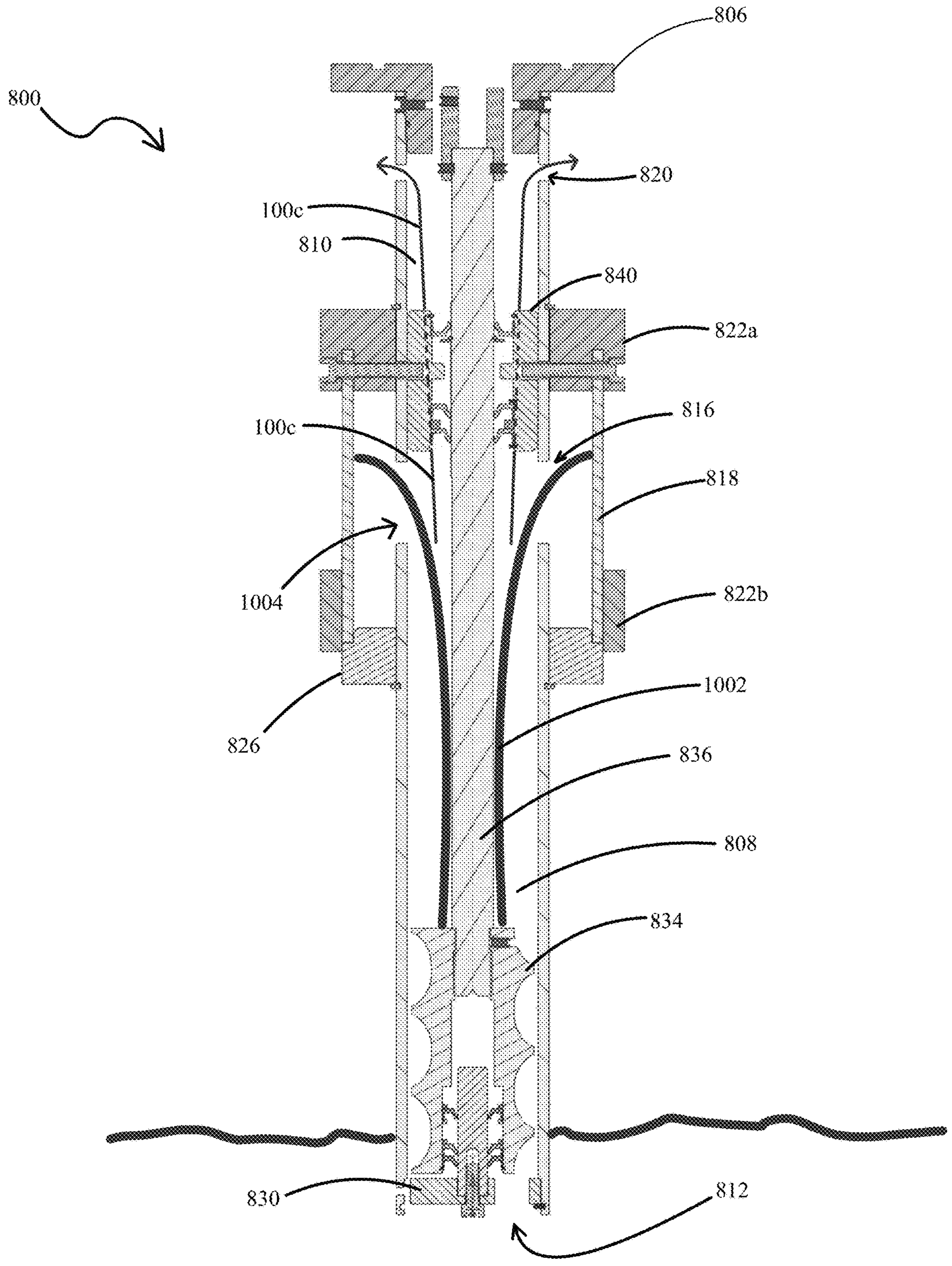
FIG. 10 is a section view of a gas extractor according to an illustrative embodiment.

With particular reference to FIG. 6, the motorized gas extractor 400 is shown in perspective view taken from the first end 814 which depicts the inlet 812 to the flow path 1100. Spanning the inlet 812 is an inlet seat 830 that provides structural rigidity to the first end 814 of main body 804 and serves a mounting surface for a centering shaft 832. The centering shaft 832, which is shown in more detail in FIG. 10, is received into an end of the agitator 834 and serves to keep the agitator 834 centered within the main body 804 during assembly and operation.

In a non-limiting embodiment, the agitator 834 is housed within the main body 804 at an upstream end of the separations chamber 808. The agitator 834 can be configured to exert a vertical and horizontal motion to the composite fluid 100. The vertical and horizontal motion of the composite fluid 100 within the separations chamber 808 can form a vortex 1002, shown in more detail in FIG. 10. The horizontal motion of the composite fluid 100 amplifies density differences at a macroscopic level to cause the composite fluid 100 to separate more rapidly. In cases where drilling fluids are composed of like fluids, the relatively more producible fluids entrained in the drilling fluids having a relatively lower density, e.g., the gaseous fraction 100*c*, will preferentially migrate toward the center of the vortex 1002 increasing the molar concentration of the producible fluids at the liberations interface, i.e., the gas/liquid interface, while the liquids fraction 100*a* and solids fraction 100*b* having a relatively higher density will migrate radially outwardly towards the sidewalls of the separations chamber 808. The vortex 1002 increases the liberation surface relative to that of conventional and other constant volume extractors.

The vertical motion of the composite fluid 100 conveys the composite fluid 100 through the flow path 1100. As the composite fluid 100 is conveyed through the flow path 1100, the vertical and horizontal motion imparted to the composite fluid 100 by the agitator 834 causes the liquid fraction 100*a* and the solids fraction 100*b* of the composite fluid 100 to be expelled from the main body 804 via the first set of apertures 816. Additionally, the agitator 834 conveys a gaseous fraction 100*c* of the composite fluid 100 into the head space chamber 810 for extraction from the second set of apertures 820. The agitator 834 is shown in more detail in FIG. 7 that follows.

Figure 7:
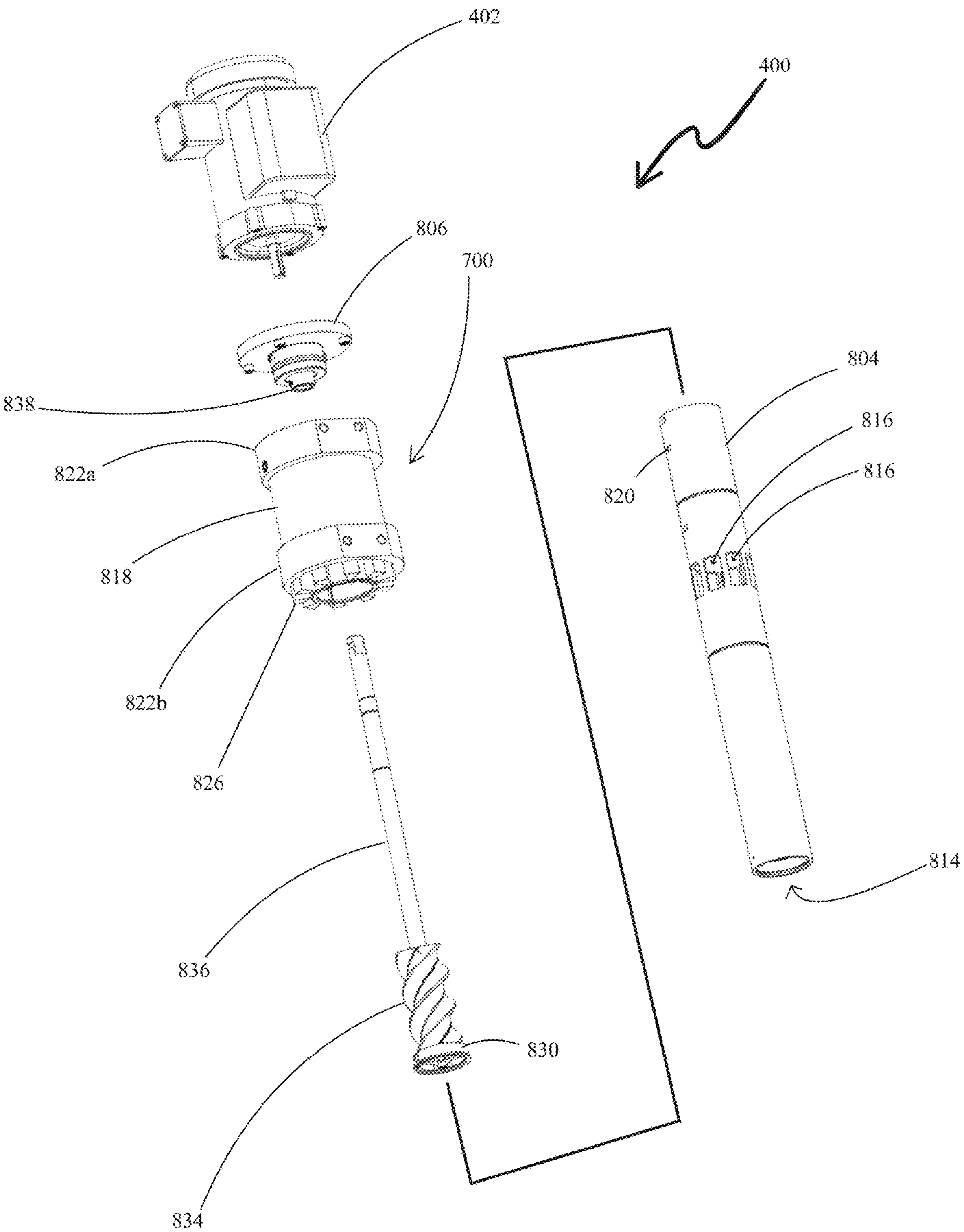
FIG. 7 is a partial exploded view of a gas extractor according to an illustrative embodiment.

FIG. 7 is a partial exploded view of a gas extractor according to an illustrative embodiment. In the partial exploded view of the motorized gas extractor 400, the agitator 834 is shown outside of the main body 804 and depicted as a screw-like structure with a helical interface disposed around its outer surface. Rotation of the agitator 834 continually in a forward direction causes the helical interface of the agitator 834 to form the vortex 1002 in the separations chamber 808. The vortex 1002 pulls composite fluid 100 into the opening 812 and conveys the composite fluid through the flow path 1100. By submerging the agitator 834 at a predetermined, optimal level, there will exist an RPM below which there will be relative changes in the ability of the agitator 834 to move the composite fluid 100 because of hydrostatic forces acting on the opening 812 of the main body 804. Using an RPM above this value, the agitator 834 will maximize the amount of flow it can create vertically. Despite changes in the hydrostatic force "pushing" drilling fluids into the bottom of the gas extractor 800, the agitator 834 will effectively be limiting the flow induced by hydrostatic forces to the amount of fluid flow it can move at a given RPM value creating a constant, or near constant, volume of fluid which is being acted on. The result is a constant volume for more quantifiable gas data that is not achievable with conventional gas extractors like gas extractor 200 in FIGS. 1 and 2. Additionally, this RPM will impart more horizontal motion on the fluid by selecting an appropriately designed helical interface. The additional motion directed radially outward will induce greater lateral acceleration and create more effective separation of the composite fluid 100 within the main body 804. Separation of the composite fluid 100 into its constituent fractions is a multivariable function reliant on, among other things, time of exposure, surface area of exposure, and differences in partial pressures at those liberation surfaces.

In a non-limiting embodiment, rotation of the agitator 834 continually in a reverse direction causes the agitator 834 to prevent the inflow of composite fluid 100 into the opening 812, which can be useful during drilling operations where mud logging is undesirable, e.g., during cementing operations.

The agitator 834 is attached to an end of a drive shaft 836 which extends coaxially through a downspout assembly 700 and connects to a drive shaft connector 838. The drive shaft connector 838 couples to the motor 402 and transfers the rotational forces from the motor 402 to the agitator 834 via the drive shaft 836. The main body 804 also extends coaxially through the downspout assembly 700 and couples to the motor mount 806.

Figure 8:
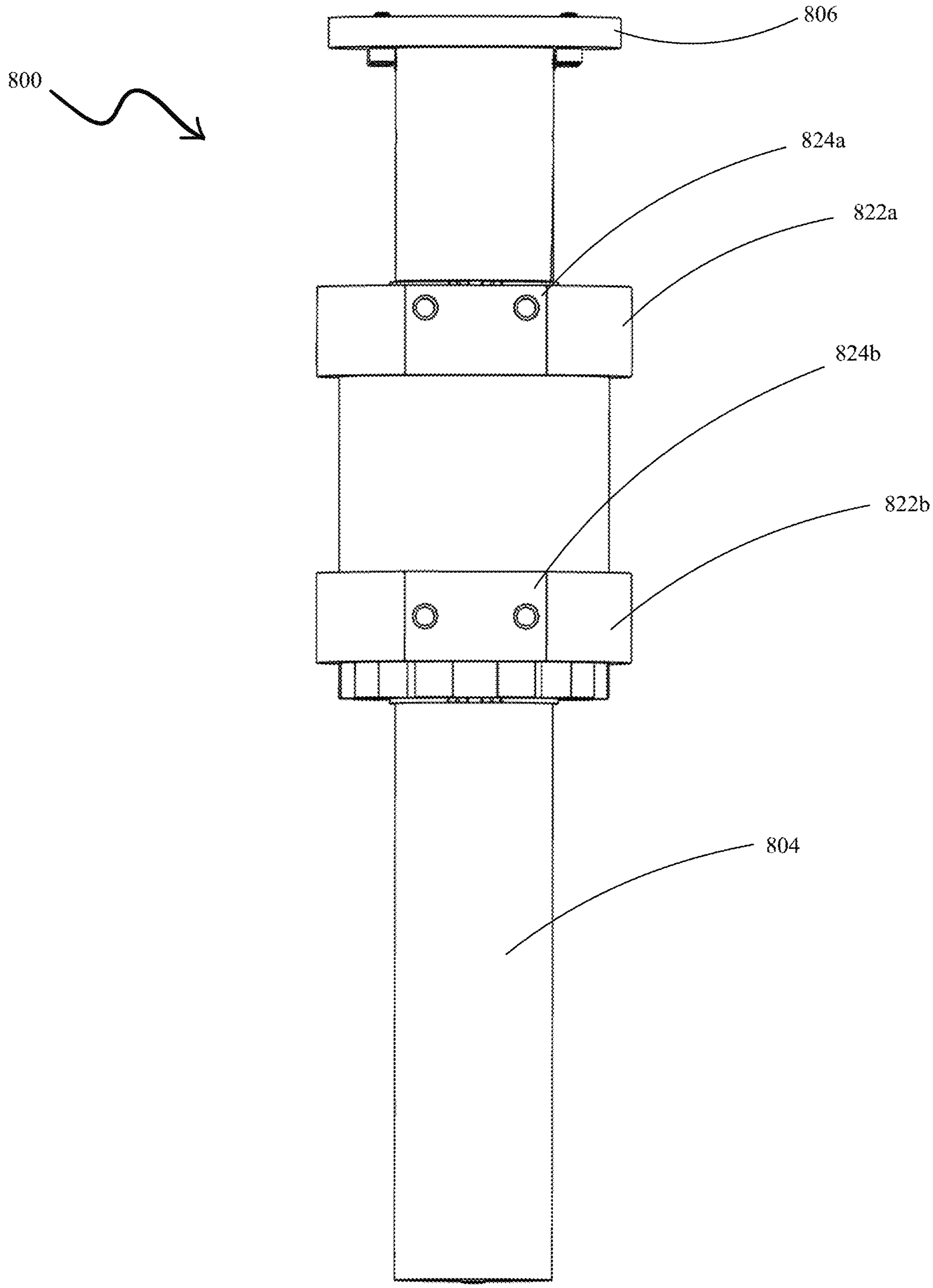
FIG. 8 is a side elevation view of a gas extractor according to an illustrative embodiment.
Figure 9:
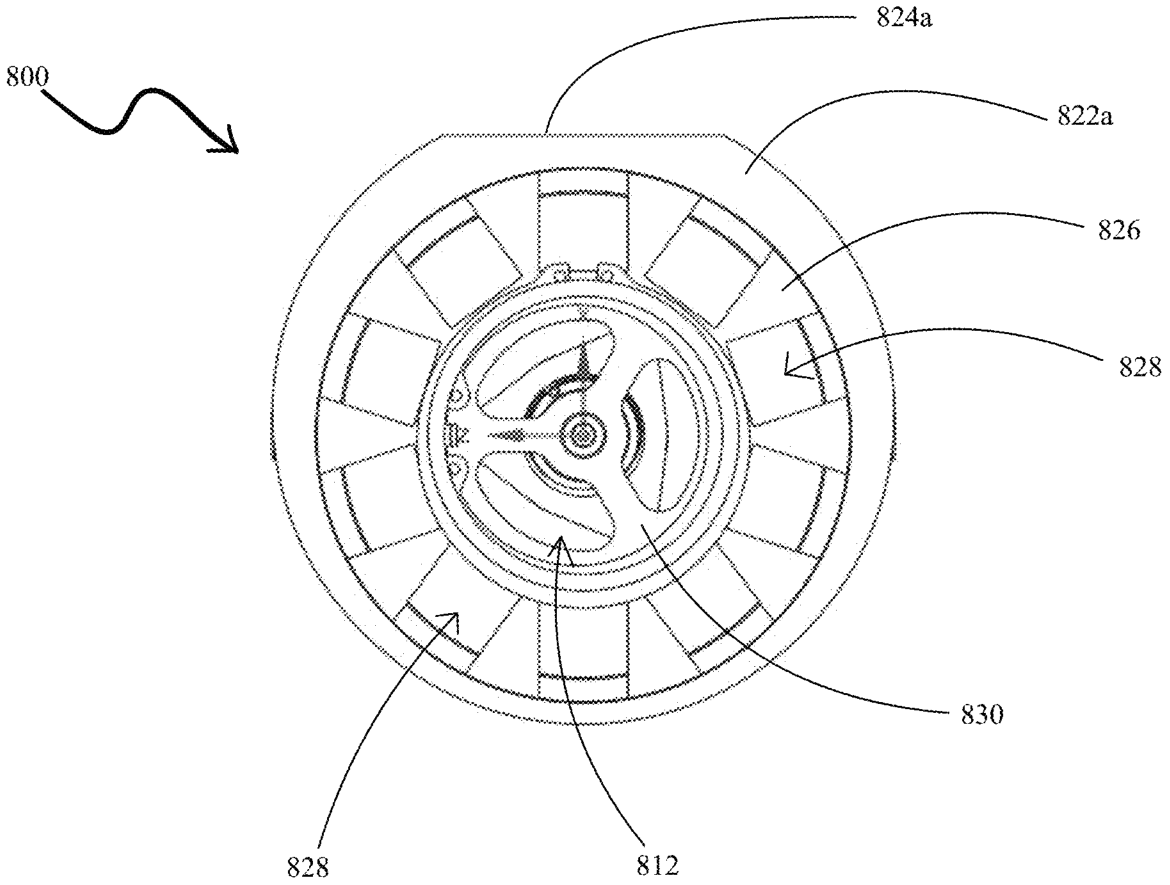
FIG. 9 is an end view of a gas extractor according to an illustrative embodiment.

FIGS. 8 and 9 are additional views of the gas extractor according to an illustrative embodiment. In particular, FIG. 8 is a side elevation view of the gas extractor 800 and FIG. 9 is an end view of the gas extractor 800 taken from the first end 814.

FIG. 10 is a section view of a gas extractor according to an illustrative embodiment. The gas extractor 800 is shown partially submerged in a composite fluid 100. Rotation of the agitator 834 draws the composite fluid 100 into the opening 812 at the first end 814 of the main body 804. The helical interface of the agitator 834 forms the vortex 1002 inside separations chamber 808. As already mentioned, the horizontal force component of the vortex 1002 causes separation of the composite fluid that results in the liberation of at least some of the gases entrained within the composite fluid 100. The vertical force component of the vortex 1002 conveys the composite fluid 100 through the flow path 1100.

In the illustrative embodiment depicted in FIG. 10, the rotational motion of the composite fluid 100 in the separations chamber 808 causes the composite fluid 100 (less the gaseous fraction 100*c* liberated from the composite fluid 100) to travel up the sidewalls of the separations chamber 808 and out the first set of apertures 816. The exiting fluid, which is returned to the vessel 302 as a recycle stream 308, forms a fluid barrier 1004 that reduces the introduction of contaminants into the head space 808. As a result, the gaseous fraction 100*c* has a lower level of contamination than some other conventional gas extractors.

In some embodiments, the separations chamber 808 and the head space chamber 810 are separated by a flow diverter 840. The flow diverter 840 is configured to permit the passage of a gaseous fraction 100*c* from the separations chamber 808 to the head space chamber 810 and prevents the passage of non-gaseous substances from the separations chamber 808 into the head space chamber 810. For example, the flow diverter 840 can include a set of gas channels 842 that fluidically connects the separations chamber 808 with the head space chamber 810. The set of gas channels 842 can also permit condensate to flow back into the separations chamber 808 from the head space chamber 810.

Figure 11:
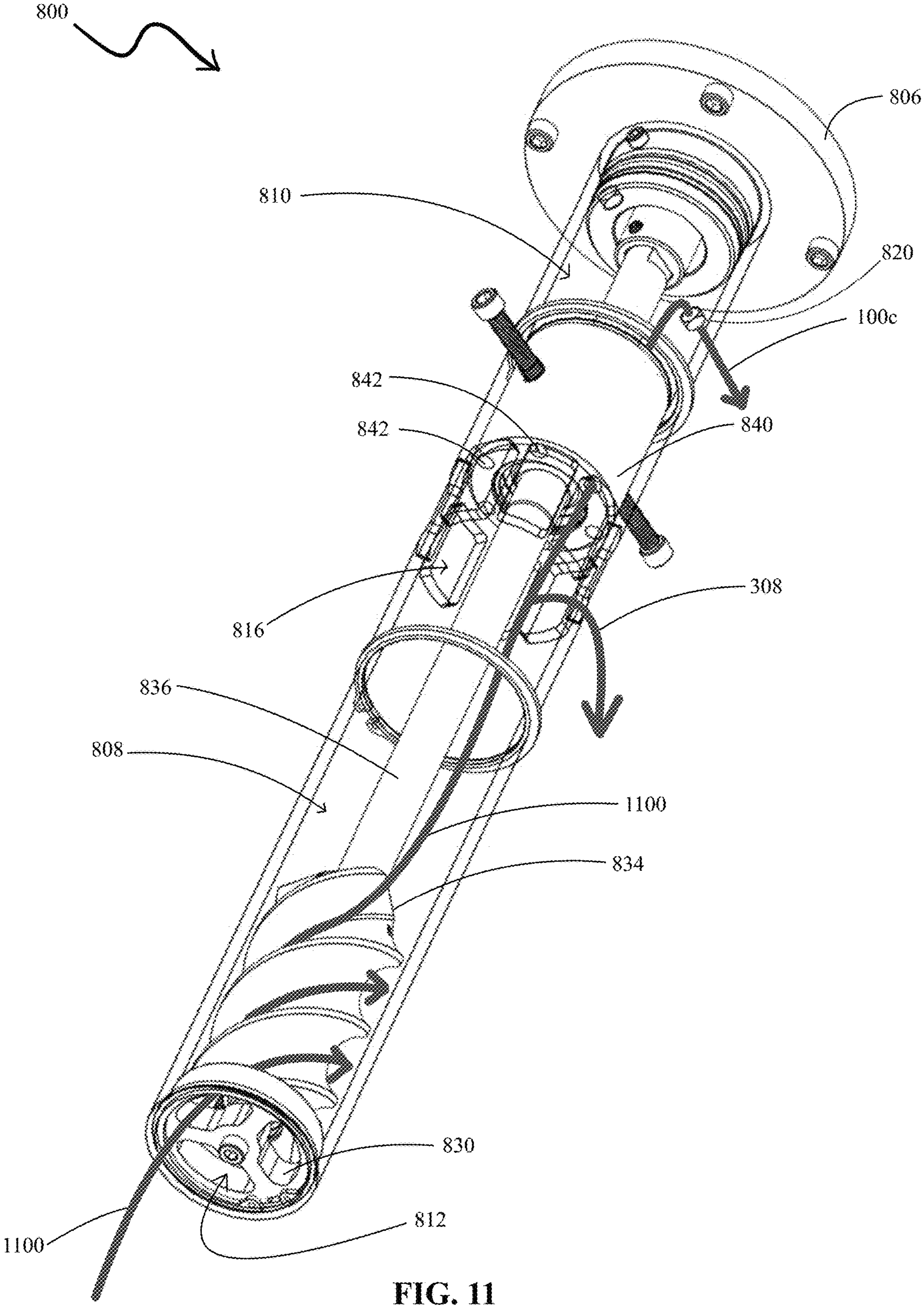
FIG. 11 is a perspective view in partial wireframe of the gas extractor according to an illustrative embodiment.

FIG. 11 is a perspective view in partial wireframe of the gas extractor according to an illustrative embodiment. The flow path 1100 depicted in FIG. 11 begins at the opening 812 of the main body 804 and continues across the helical interface of the agitator 834 and towards the downstream end of the separations chamber 808. The flow path 1100 passes through the set of gas channels 842 and into the head space chamber 810. The rate of speed at which fluid travels through the flow path 1100 can be controlled by a varying the speed and/or direction of the motor 804, as well as the dimensions of the helical interface of the agitator 834.

Figure 12:
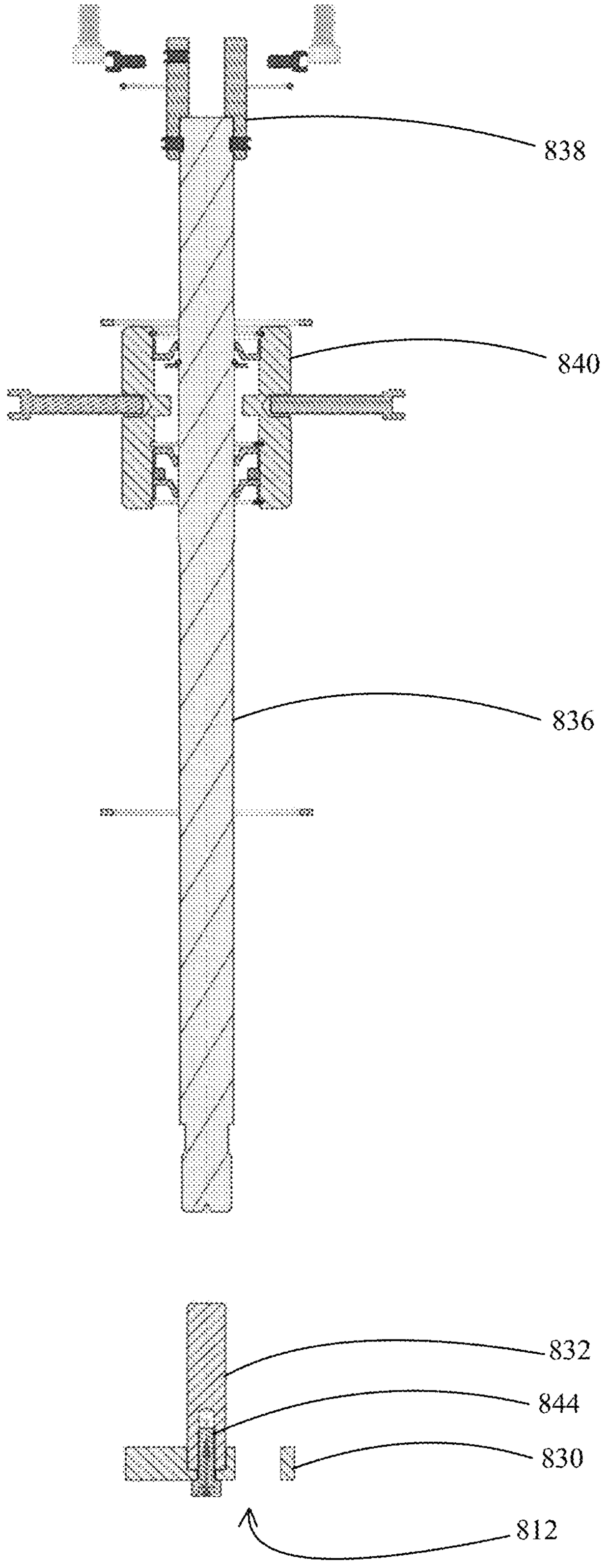
FIG. 12 is a section view of the gas extractor which depicts selected components for supporting and centering the rotational elements in accordance with an illustrative embodiment.

FIG. 12 is a section view of the gas extractor which depicts selected components for supporting and centering the rotational elements in accordance with an illustrative embodiment. The drive shaft 836 and the agitator 834 (omitted for the sake of clarity) are centered within the main body 804 at various locations along a length of the gas extractor 800. In the embodiment depicted in FIG. 12, the drive shaft 836 and agitator 834 assembly is supported and centered at three locations. The drive shaft 834 can be centered and supported at one end by the connection with the drive shaft connector 838. A more detailed view of this portion of the gas extractor 800 is shown in more detail in FIG. 19. The drive shaft 836 and agitator 834 assembly can also be supported and centered at the first end 814 by a centering shaft 832 connected to the inlet seat 830 by a centering pin 844. Although not shown in this figure, a bearing assembly 846 can be mounted between the centering shaft 832 and the agitator 834, preferentially between the rubber seals 848. A more detailed view of this portion of the gas extractor 800 is shown in FIG. 17 that follows.

The drive shaft 836 can also supported and centered at a location along its length between its two ends. In a non-limiting embodiment shown in FIG. 12, the drive shaft 836 is supported and centered by the flow diverter 840, which is in turn secured to the main body 804 and the downspout assembly 700. Although not shown in this figure, one or more bearing assemblies 846 can be mounted between the drive shaft 836 and the flow diverter 840, preferentially between the rubber seals 848. A more detailed view of this portion of the gas extractor 800 is shown in FIG. 18 that follows.

Figure 13:
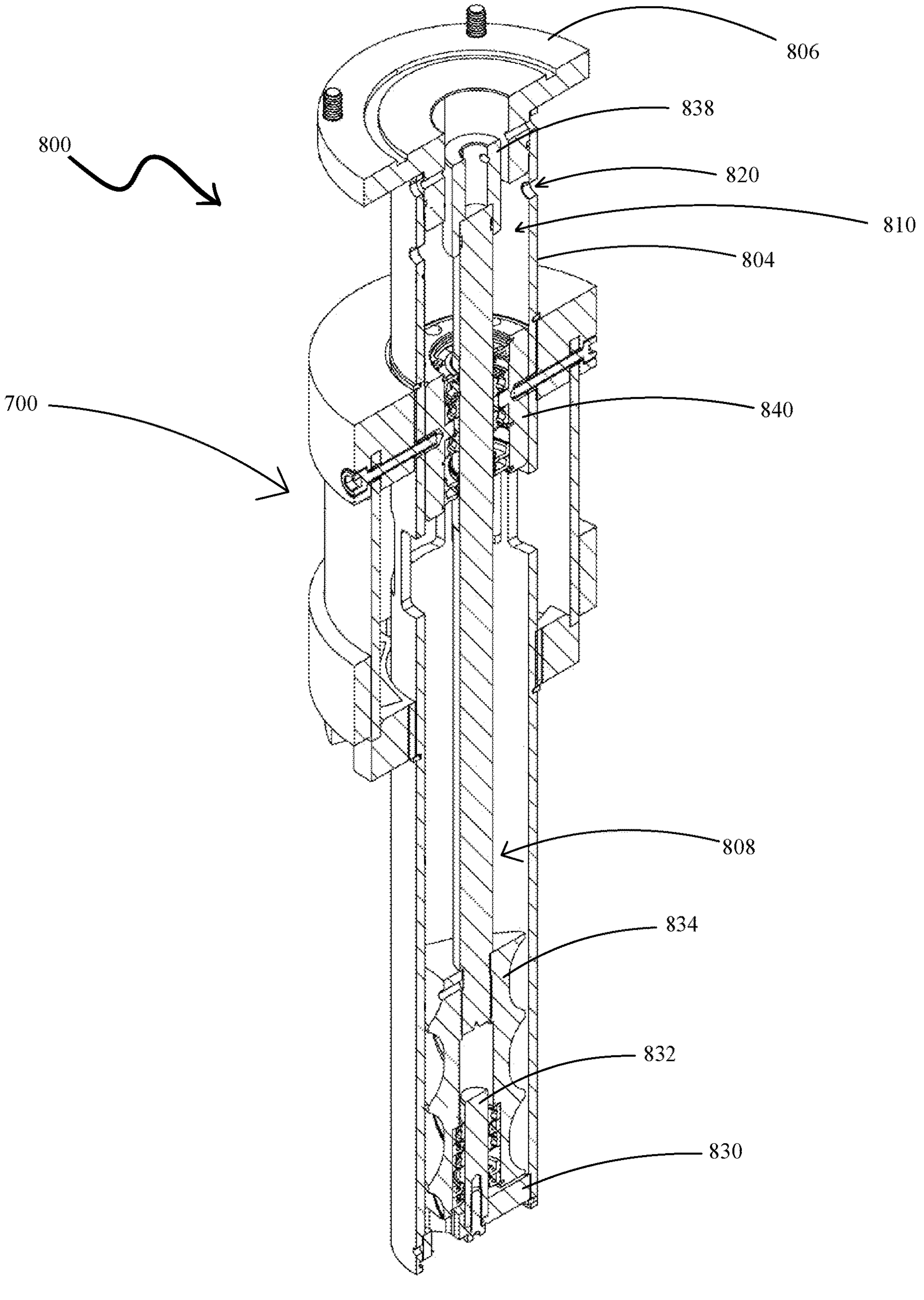
FIG. 13 is a perspective section view in wireframe of the gas extractor according to an illustrative embodiment.
Figure 14:
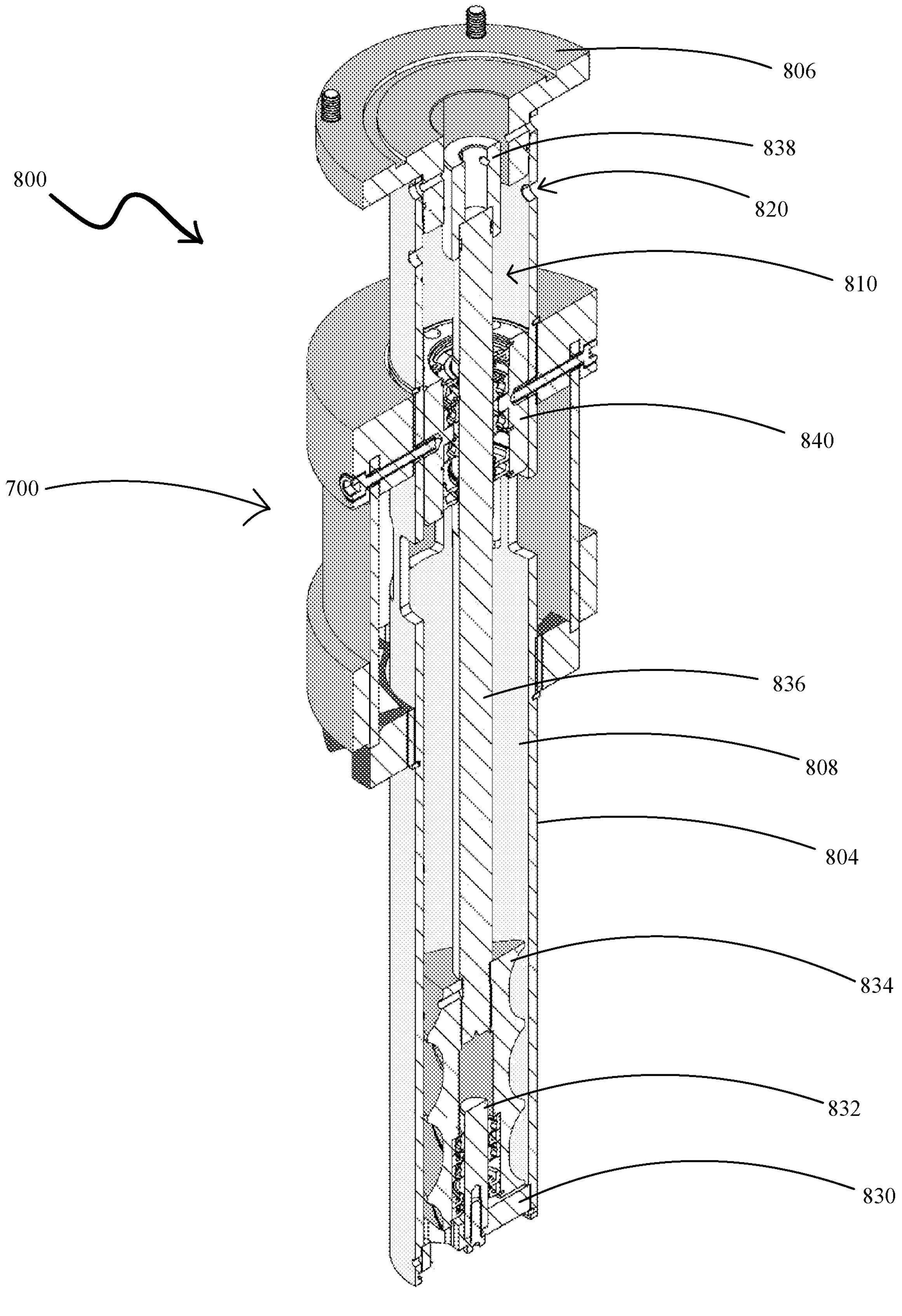
FIG. 14 is a perspective section view of the gas extractor according to an illustrative embodiment.
Figure 15:
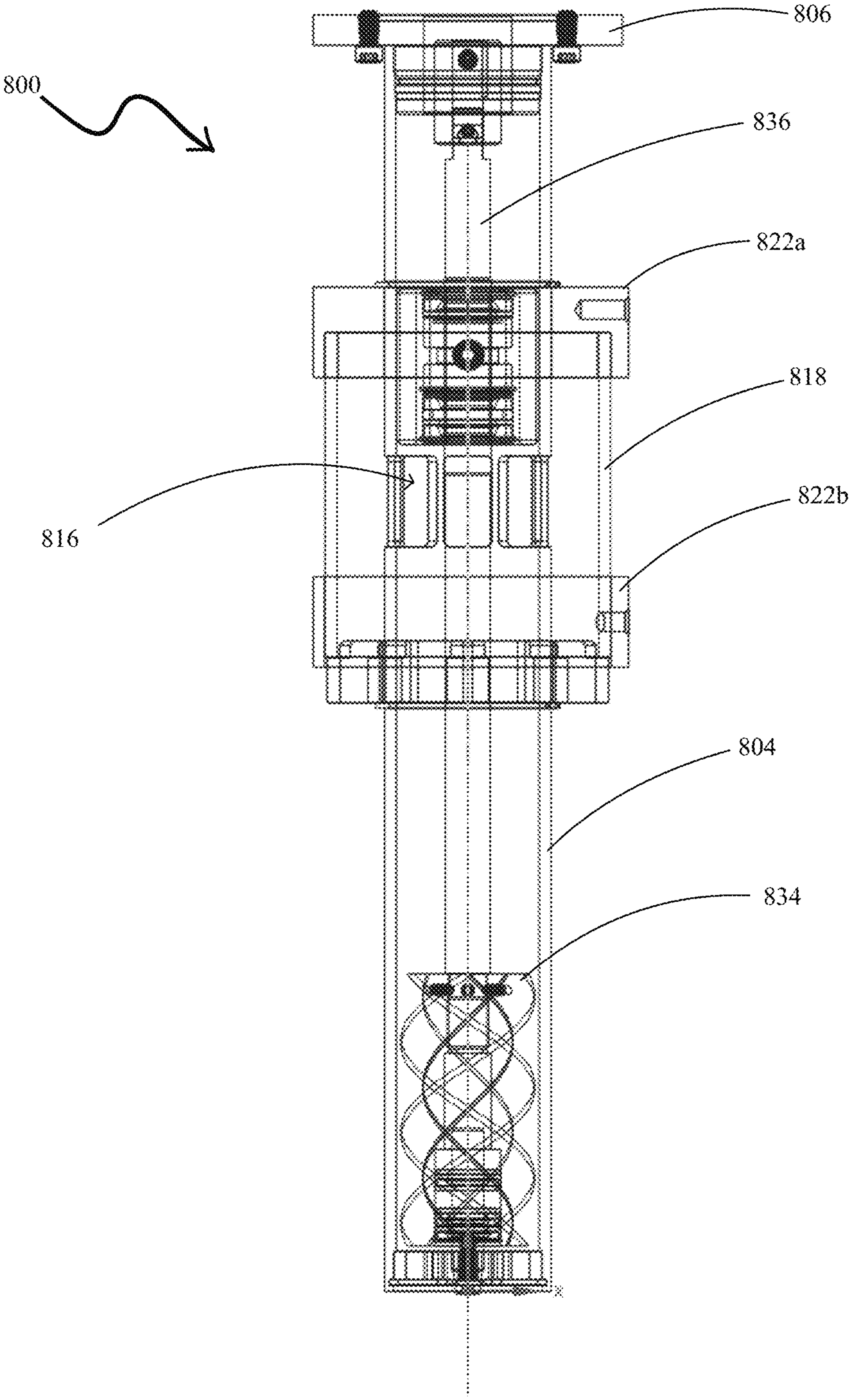
FIG. 15 is an elevation view in wireframe of the gas extractor according to an illustrative embodiment.
Figure 16:
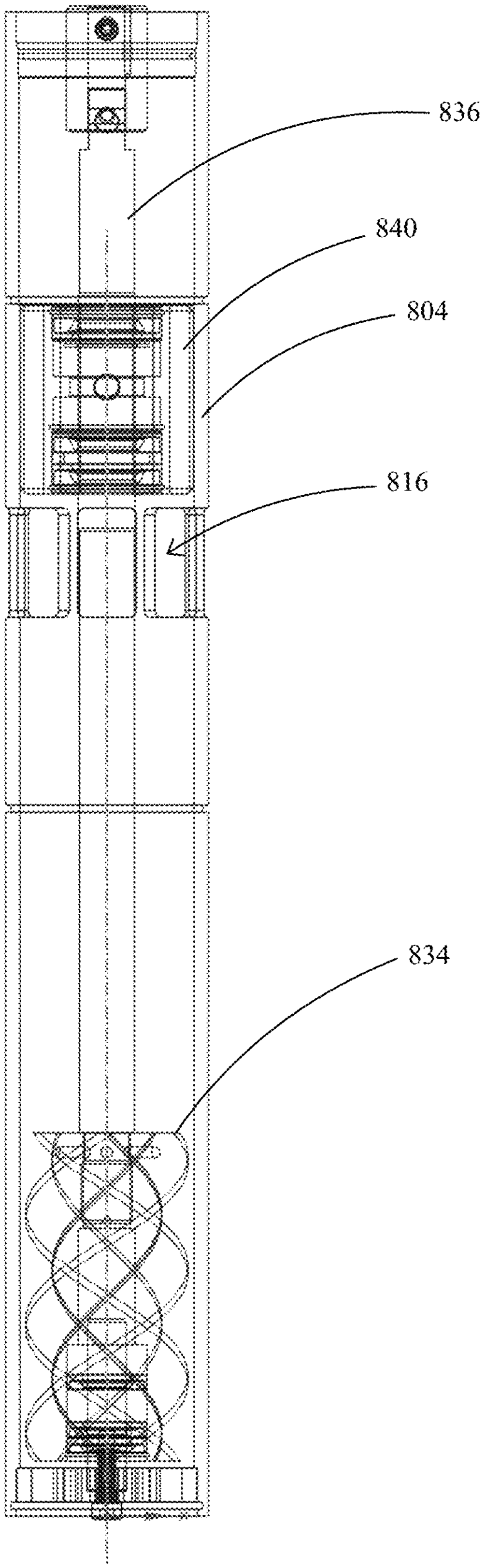
FIG. 16 is another elevation view in wireframe of the gas extractor according to an illustrative embodiment.

FIGS. 13-16 are additional perspective views of the gas extractor according to an illustrative embodiment. In particular, FIG. 13 is a perspective section view in wireframe of the gas extractor 800. FIG. 14 is a perspective section view of the gas extractor 800. FIG. 15 is an elevation view in wireframe of the gas extractor 800. FIG. 16 is another elevation view in wireframe of the gas extractor 800, but without the motor mount 806 or the downspout assembly 700.

Figure 17:
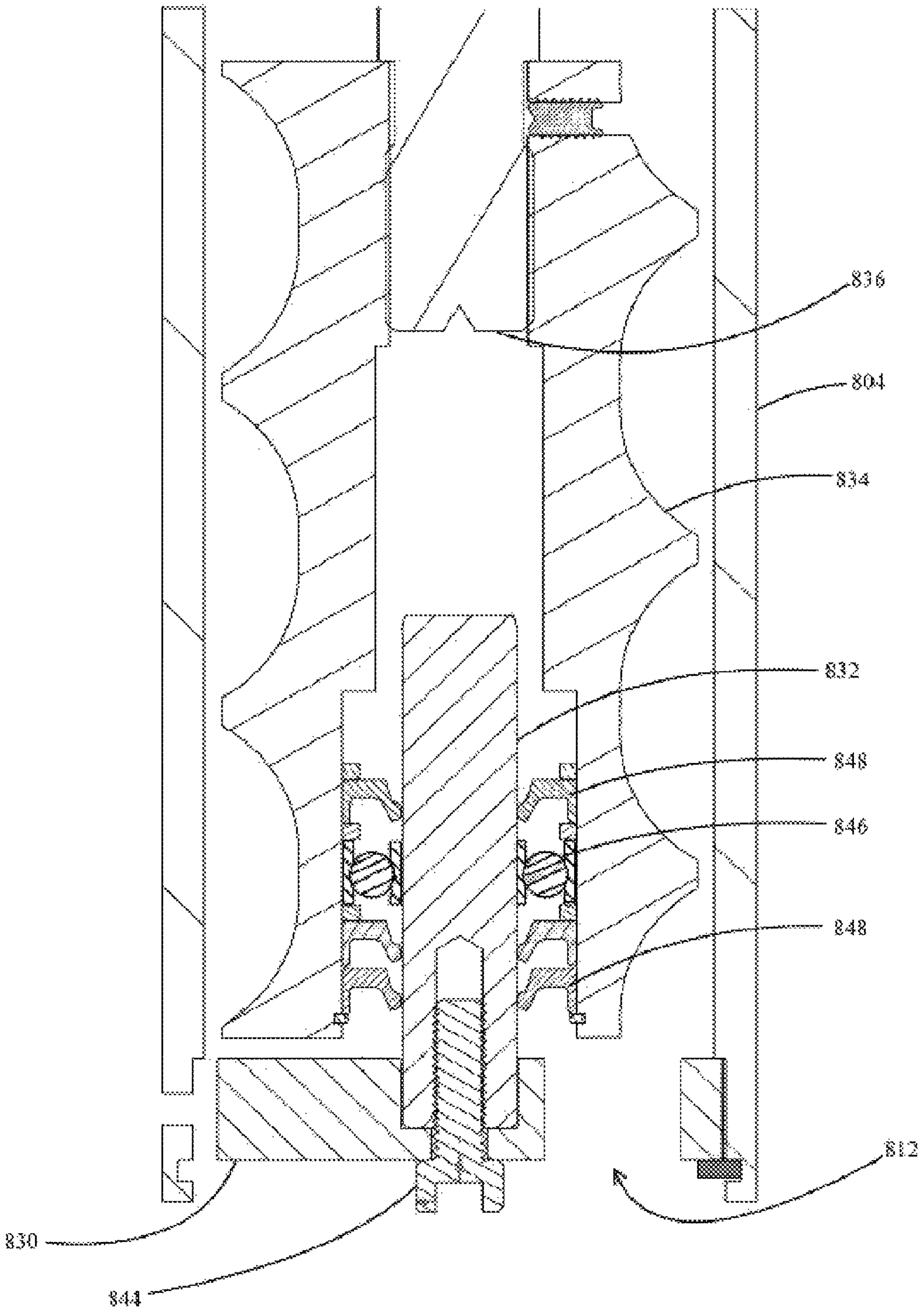
FIG. 17 is a more detailed section view of the support and centering structure at a first end of a gas extractor according to an illustrative embodiment.
Figure 18:
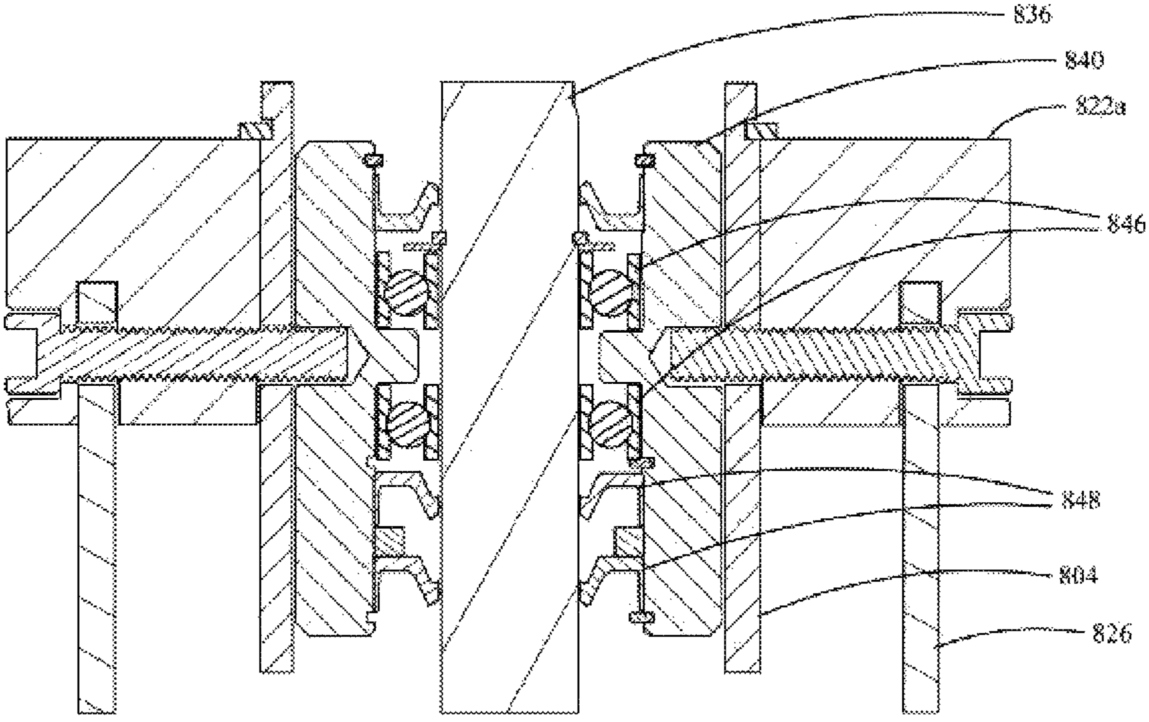
FIG. 18 is a more detailed section view of the support and centering structure along a length of the drive shaft of the gas extractor according to an illustrative embodiment.
Figure 19:
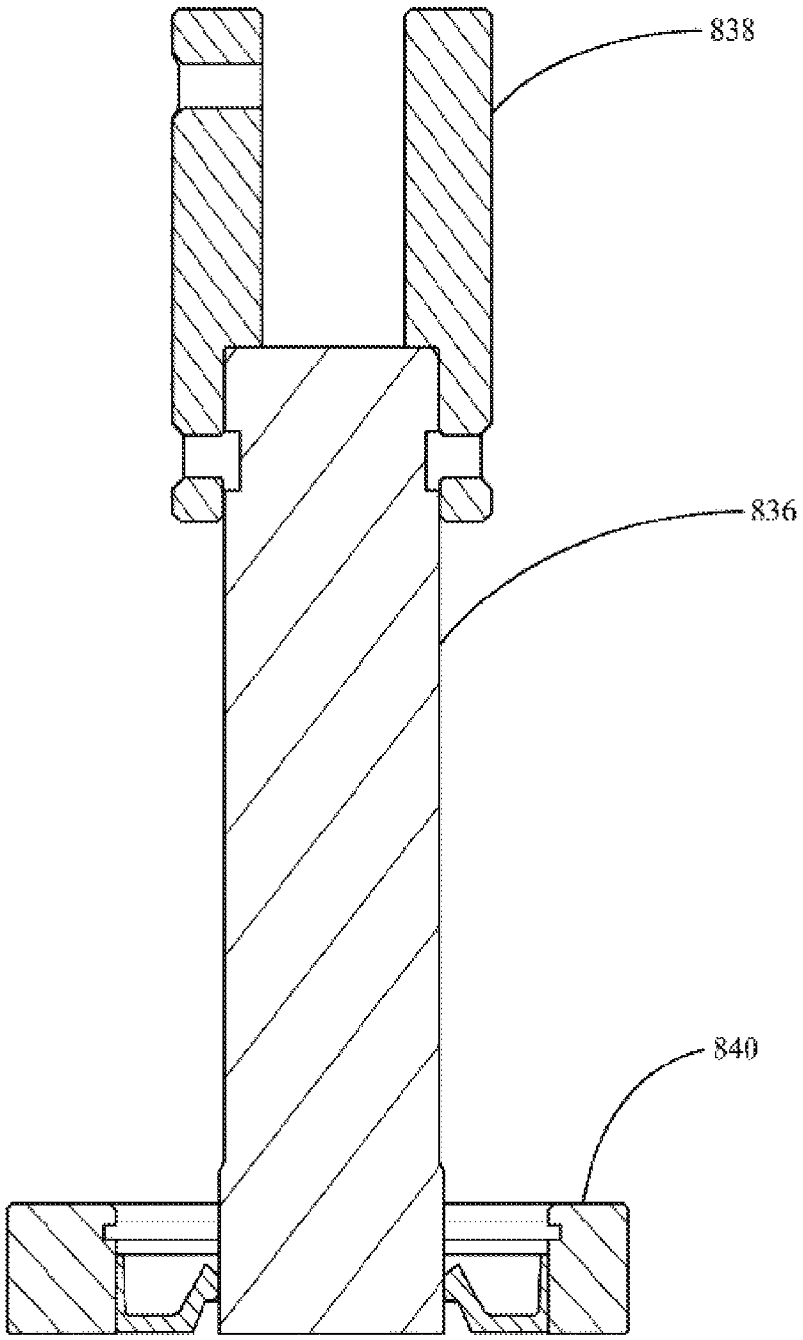
FIG. 19 is a more detailed section view of the support and centering structure a downstream end of the gas extractor according to an illustrative embodiment.

FIGS. 17-19 are various detailed sectional views of the gas extractor according to an illustrative embodiment. In particular, FIG. 17 is a more detailed section view of the support and centering structure at a first end 814 of the gas extractor 800. FIG. 18 is a more detailed section view of the support and centering structure along a length of the drive shaft 836 of the gas extractor 800. FIG. 19 is a more detailed section view of the support and centering structure a downstream end of the gas extractor 800.

Figure 20:
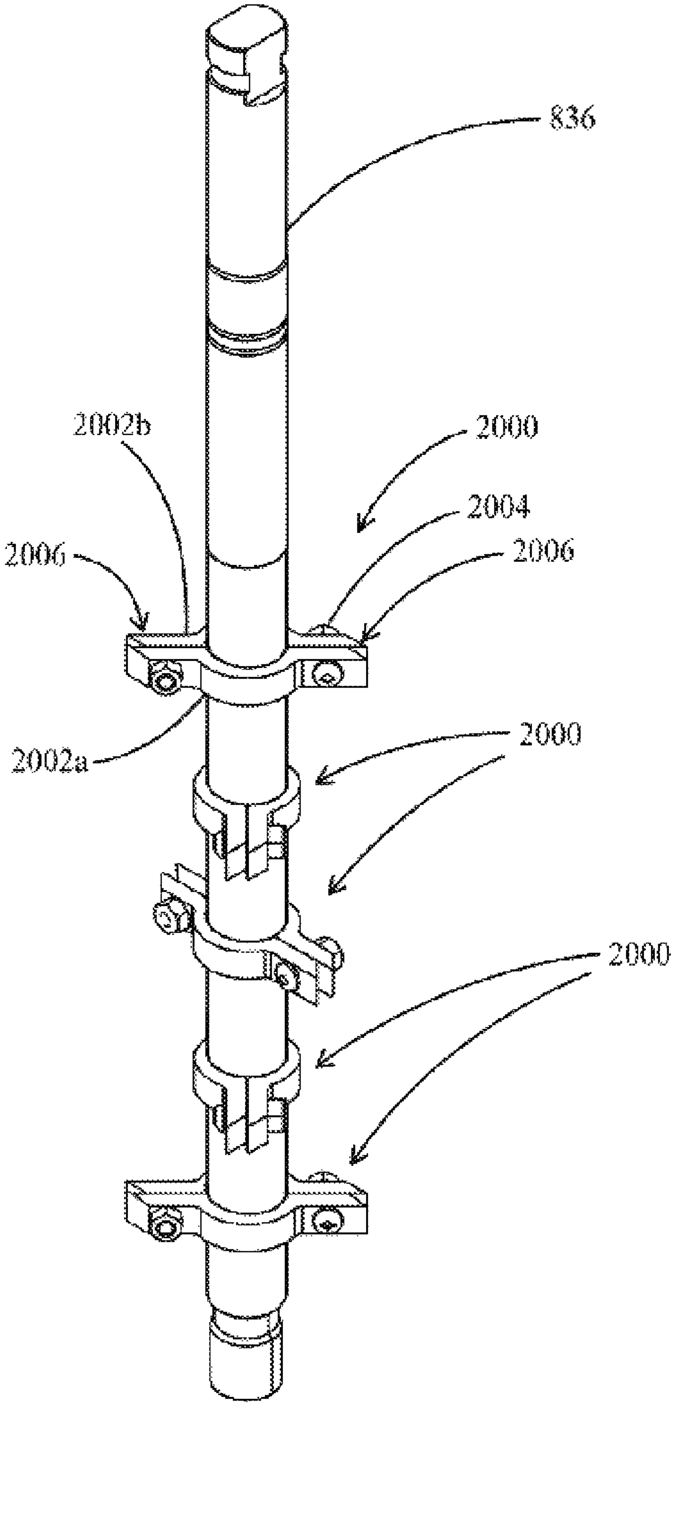
FIG. 20 is a perspective view depicting a set of agitating arms disposed around a drive shaft that can be implemented in a gas extractor according to an illustrative embodiment.

FIG. 20 is a perspective view depicting a set of agitating arms disposed around a drive shaft that can be implemented in a gas extractor according to an illustrative embodiment. The set of agitating arms 2000 can be disposed along a length of the drive shaft 836 housed within the separations chamber 808. The set of agitating arms 2000 is configured to cavitate the composite fluid 100, induce additional turbidity, and maintain optimal velocity of the composite fluid 100 separations chamber 808 to prolong density differences. Thus, the set of agitating arms 2000 is configured to increase the amount of the gaseous fraction 100*c* liberated from the composite fluid 100 conveyed through the separations chamber 808.

In operation, rotation of the drive shaft 836 causes rotation of the agitator 834, which lifts the composite fluid 100 upward and along the flow path 1100. Each of the agitating arms 2000 are rotatably fixed to the drive shaft 834 so that rotation of the drive shaft 836 to cause rotation of the agitator 834 also causes rotation of each of the agitating arms 2000. In the absence of the set of agitating arms 2000, rotation of the agitator 834 results in the formation of a vortex of composite liquid 100 in the separations chamber 808 with a generally conical shape. However, the presence of the agitating arms 2000 about the drive shaft 836 breaks up the generally conical shape of the air-liquid interface, increasing the release of the gaseous fraction 100*c* from the composite liquid 100.

Each of the set of agitating arms 2000 has one or more elongated arms 2006 extending radially outward from the drive shaft 836. In the non-limiting embodiment in FIG. 20, each of the set of agitating arms 2000 includes two elongated arms 2006 extending almost to the inner surface of the main body 804. Further, each of the set of agitating arms 2000 is depicted as being formed from a pair of body segments 2002*a* and 2002*b* that are coupled together about a circumference of the drive shaft 836 by removable fasteners 2004. However, the particular configuration of the agitating arms 2000 shown in FIG. 20 should be deemed exemplary and non-limiting.

Although embodiments of the disclosure have been described with reference to several elements, any element described in the embodiments described herein are exemplary and can be omitted, substituted, added, combined, or rearranged as applicable to form new embodiments. A skilled person, upon reading the present specification, would recognize that such additional embodiments are effectively disclosed herein. For example, where this disclosure describes characteristics, structure, size, shape, arrangement, or composition for an element or process for making or using an element or combination of elements, the characteristics, structure, size, shape, arrangement, or composition can also be incorporated into any other element or combination of elements, or process for making or using an element or combination of elements described herein to provide additional embodiments.

Additionally, where an embodiment is described herein as comprising some element or group of elements, additional embodiments can consist essentially of or consist of the element or group of elements. Also, although the open-ended term "comprises" is generally used herein, additional embodiments can be formed by substituting the terms "consisting essentially of" or "consisting of."

While this disclosure has been particularly shown and described with reference to preferred embodiments, it will be understood by those skilled in the art that various changes in form and detail may be made therein without departing from the spirit and scope of the disclosure. The inventors expect skilled artisans to employ such variations as appropriate, and the inventors intend the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

We claim:

1. An apparatus for separating gas from a composite fluid, the apparatus comprising:

a main body defining a flow path formed from a separations chamber at an upstream end of the flow path and a head space chamber at the downstream end of the flow path, wherein the main body further comprises:

a first set of apertures formed in the separations chamber portion of the main body, a second set of apertures formed in the head space chamber portion of the main body; and an agitator housed within the main body at an upstream end of the separations chamber, wherein:

the agitator is configured to generate a vortex that conveys the composite fluid through the flow path, the vortex expels a liquid fraction and a solids fraction of the composite fluid from the main body via the first set of apertures, and the vortex conveys a gaseous fraction of the composite fluid into the head space chamber for extraction from the second set of apertures; and a downspout sleeve circumscribing at least a portion of the separations chamber portion of the main body in which the first set of apertures are formed, wherein the downspout sleeve is configured to constrain the liquids fraction and the solids fraction expelled from the separations chamber.

2. The apparatus of claim 1, wherein the first set of apertures is formed in the main body at a downstream end of the separations chamber, and wherein the second set of apertures is formed in the main body at a downstream end of the head space chamber.

3. The apparatus of claim 1, further comprising:

a drive shaft extending through the main body, wherein the drive shaft couples the agitator to a motor configured to provide a motive force to the agitator.

4. The apparatus of claim 1, further comprising:

at least one mounting ring secured to the main body, wherein the downspout sleeve is affixed about the main body by the at least one mounting ring.

5. The apparatus of claim 4, further comprising:

a flow diverter housed within the main body and disposed between the separations chamber and the head space chamber, wherein the flow diverter is secured with the at least one mounting ring.

6. The apparatus of claim 5, wherein the flow diverter includes a set of channels allowing the gaseous fraction of the composite fluid to pass from the separations chamber to the head space chamber.

7. The apparatus of claim 1, further comprising:

a downspout annulus coupled between the main body and the downspout sleeve, wherein the downspout annulus includes one or more apertures.

8. The apparatus of claim 1, wherein the agitator comprises one or more helical interfaces configured to generate the vortex of the composite fluid within the main body.

9. The apparatus of claim 1, wherein the main body is an elongated cylinder.

10. The apparatus of claim 1, further comprising:

a motor; and a drive shaft coupled to the motor and the agitator, wherein the motor is configured to operate at one of a plurality of operating speeds.

11. The apparatus of claim 10, wherein the motor is operable to prevent the composite fluid from entering the flow path.

12. The apparatus of claim 1, wherein the agitator is configured to exert vertical motion and horizontal motion on the composite fluid.

13. The apparatus of claim 12, wherein the vertical motion is opposite to the gravitational vector, and wherein the horizontal motion is radially outward.

14. The apparatus of claim 1, wherein the agitator includes a helical interface.

15. The apparatus of claim 3, further comprising:

a set of agitating arms disposed around a circumference of the drive shaft, wherein the set of agitating arms is configured to cavitate the composite fluid conveyed along the flow path.

16. A system comprising:

a vessel accumulating a composite fluid including a gas;

a gas extractor configured to separate the gas from the composite fluid to form a gaseous fraction; and a gas analyzer fluidically coupled to the gas extractor, wherein the gas analyzer is configured to analyze the gaseous fraction, wherein the gas extractor includes:

a main body defining a flow path formed from a separations chamber at an upstream end of the flow path and a head space chamber at the downstream end of the flow path, wherein the main body further comprises:

a first set of apertures formed in the separations chamber portion of the main body, and a second set of apertures formed in the head space chamber portion of the main body;

an agitator housed within the main body at an upstream end of the separations chamber, wherein:

the agitator is configured to generate a vortex that conveys the composite fluid through the flow path, the vortex expels a liquid fraction and a solids fraction of the composite fluid from the main body via the first set of apertures, and the vortex conveys a gaseous fraction of the composite fluid into the head space chamber for extraction from the second set of apertures; and a downspout sleeve circumscribing at least a portion of the separations chamber portion of the main body in which the first set of apertures are formed, wherein the downspout sleeve is configured to constrain the liquids fraction and the solids fraction expelled from the separations chamber.

17. The system of claim 16, wherein the first set of apertures is formed in the main body at a downstream end of the separations chamber, and wherein the second set of apertures is formed in the main body at a downstream end of the head space chamber.

18. The system of claim 16, further comprising:

a drive shaft extending through the main body, wherein the drive shaft couples the agitator to a motor configured to provide a motive force to the agitator.

19. The system of claim 16, further comprising:

at least one mounting ring secured to the main body, wherein the downspout sleeve is affixed about the main body by the at least one mounting ring.

20. The system of claim 19, further comprising:

a flow diverter housed within the main body and disposed between the separations chamber and the head space chamber, wherein the flow diverter is secured with the at least one mounting ring.

21. The system of claim 20, wherein the flow diverter includes a set of channels allowing the gaseous fraction of the composite fluid to pass from the separations chamber to the head space chamber.

22. The system of claim 16, further comprising:

a downspout annulus coupled between the main body and the downspout sleeve, wherein the downspout annulus includes one or more apertures.

23. The system of claim 16, wherein the agitator comprises one or more helical interfaces configured to generate the vortex of the composite fluid within the main body.

24. The system of claim 16, wherein the main body is an elongated cylinder.

25. The system of claim 16, further comprising:

a motor; and a drive shaft coupled to the motor and the agitator, wherein the motor is configured to operate at one of a plurality of operating speeds.

26. The apparatus of claim 25, wherein the motor is operable to prevent the composite fluid from entering the flow path.

27. The apparatus of claim 16, wherein the agitator is configured to exert vertical motion and horizontal motion on the composite fluid.

28. The apparatus of claim 27, wherein the vertical motion is opposite to the gravitational vector, and wherein the horizontal motion is radially outward.

29. The apparatus of claim 16, wherein the agitator includes a helical interface.

30. A method of operating a gas extractor, the method comprising:

receiving a composite fluid into an inlet of the gas extractor, wherein the inlet is at a first end of a main body defining a flow path formed from a separations chamber at an upstream end of the flow path and a head space chamber at the downstream end of the flow path;

generating a vortex in the composite fluid within the main body, wherein the vortex is generated by an agitator housed within the main body, and wherein the vortex conveys the composite fluid through the flow path;

expelling a liquid fraction and a solids fraction of the composite fluid from the main body through a first set of apertures formed in the separations chamber portion of the main body;

constraining the liquids fraction and the solids fraction expelled from the separations chamber with a downspout sleeve circumscribing at least a portion of the separations chamber portion of the main body in which the first set of apertures are formed; and conveying a gaseous fraction of the composite fluid into the head space chamber for extraction from a second set of apertures formed in the head space chamber portion of the main body.

31. The method of claim 30, wherein the vortex maintains a substantially constant volume of the composite fluid in the separations chamber.

32. The method of claim 30, changing a rotational speed of the agitator based on a desired volume of the composite fluid within the separations chamber.

33. The method of claim 30, further comprising:

extracting the gaseous fraction from the head space chamber for analysis.

34. The method of claim 33, further comprising:

conveying the gaseous fraction extracted from the head space chamber to a gas analyzer for analysis.

35. The method of claim 30, further comprising:

submerging the main body into a volume of the composite fluid to a predetermined depth;

rotating the agitator in a first direction to prevent the composite fluid from entering the inlet of the gas extractor until sampling of the composite fluid is ready to begin; and rotating the agitator in an opposite direction to receive the composite fluid into the inlet of the gas extractor.

* * * * *